United States Patent
Stadler et al.

(10) Patent No.: US 7,108,162 B2
(45) Date of Patent: Sep. 19, 2006

(54) ROOF RACK FOR VEHICLES

(75) Inventors: Bernd Stadler, Eberdingen (DE); Dan Svenningsson, Ulricehamn (SE)

(73) Assignees: Dr. Ing. h.c.F. Porsche AG, Stuttgart (DE); Mont Blan Industri AB, Dalsjoefors (SE)

( * ) Notice: Subject to any disclaimer, the term of this patent is extended or adjusted under 35 U.S.C. 154(b) by 319 days.

(21) Appl. No.: 10/659,712

(22) Filed: Sep. 11, 2003

(65) Prior Publication Data

US 2004/0124221 A1 Jul. 1, 2004

(30) Foreign Application Priority Data

Sep. 12, 2002 (DE) ............... 102 42 281
Apr. 4, 2003 (DE) ............... 103 15 329

(51) Int. Cl.
 *B60R 9/42* (2006.01)
(52) U.S. Cl. ............ 224/310; 224/315; 224/326; 414/462
(58) Field of Classification Search ........ 224/310, 224/315, 320, 321, 325, 326, 548, 553, 554; 414/465, 466, 462; 296/3
See application file for complete search history.

(56) References Cited

U.S. PATENT DOCUMENTS

| | | | | |
|---|---|---|---|---|
| 2,551,351 A | * | 5/1951 | Swenson | 414/462 |
| 4,003,485 A | * | 1/1977 | Edgerton | 414/462 |
| 4,446,998 A | * | 5/1984 | Taig | 224/329 |
| 4,858,803 A | * | 8/1989 | Gerber | 224/329 |
| 5,058,791 A | * | 10/1991 | Henriquez et al. | 224/310 |
| 5,297,912 A | * | 3/1994 | Levi | 414/462 |
| 5,360,150 A | * | 11/1994 | Praz | 224/310 |
| 5,397,042 A | * | 3/1995 | Pedrini | 224/329 |
| 5,417,358 A | * | 5/1995 | Haselgrove | 224/310 |
| 5,544,796 A | * | 8/1996 | Dubach | 224/310 |
| 5,782,391 A | * | 7/1998 | Cretcher | 224/310 |
| 5,827,036 A | * | 10/1998 | Steffes et al. | 414/462 |
| 5,884,824 A | * | 3/1999 | Spring, Jr. | 224/310 |
| 5,988,470 A | * | 11/1999 | Siciliano | 224/310 |
| 6,015,074 A | * | 1/2000 | Snavely et al. | 224/310 |
| 6,158,638 A | | 12/2000 | Szigeti | |
| 6,164,236 A | * | 12/2000 | Liu | 114/343 |
| 6,179,543 B1 | * | 1/2001 | Adame et al. | 414/462 |
| 6,315,181 B1 | * | 11/2001 | Bradley et al. | 224/310 |
| 6,360,930 B1 | * | 3/2002 | Flickenger | 224/310 |
| 6,428,263 B1 | | 8/2002 | Schellens | |
| 6,715,652 B1 | * | 4/2004 | Kmita et al. | 224/314 |
| 6,764,268 B1 | * | 7/2004 | Levi | 414/462 |
| 6,874,835 B1 | * | 4/2005 | Silverness | 296/3 |
| 2004/0047716 A1 | * | 3/2004 | Hendley et al. | 414/462 |

FOREIGN PATENT DOCUMENTS

DE 36262896 2/1988
DE 195 43 218 A1 1/1997

(Continued)

*Primary Examiner*—Nathan J. Newhouse
*Assistant Examiner*—Justin M. Larson
(74) *Attorney, Agent, or Firm*—Crowell & Moring LLP

(57) ABSTRACT

On a roof rack fixedly connected with the vehicle roof, a so-called loading aid is arranged which, in a loading position, can be swung out inclinedly on the sides of the vehicle, so that bicycles or the like can be placed on this loading aid by corresponding transport fixtures and, after being fitted with the bicycles, the loading aid can be pushed back into a transport position onto the roof.

22 Claims, 10 Drawing Sheets

FOREIGN PATENT DOCUMENTS

| | | |
|---|---|---|
| DE | 19723360 | 12/1998 |
| EP | 0101054 | 2/1984 |
| EP | 0511179 | 10/1992 |
| FR | 2596344 | 10/1987 |
| JP | 07266999 | 10/1995 |
| WO | WO-87/07568 | 12/1987 |

* cited by examiner

ROOF RACK FOR VEHICLES

This application claims the priority of German Patent Documents 102 42 281.8, filed Sep. 12, 2002, and 103 15 329.2, filed Apr. 4, 2003, the disclosures of which are expressly incorporated by reference herein.

BACKGROUND AND SUMMARY OF THE INVENTION

The invention relates to a roof rack for vehicles.

German Patent Document DE 195 43 218 A1 discloses a roof rack for vehicles which has a basic carrier which can be stationarily fixed on the vehicle. A load carrier is connected with the basic carrier and can be displaced into a inclined loading position on the base carrier and into a lifted transport position on the vehicle roof.

It is an object of the invention to provide an improved roof rack for a motor vehicle which comprises a loading aid which is easy to handle, is safely supported in a loading position and, in a transport position, is held in a secured manner on the roof rack.

The principal advantages achieved by the invention are that, by means of the loading element, which consists of a load bearing structure and can be swung out laterally of the vehicle, for example, bicycles can be put on at a low height from the vehicle side, and these bicycles are then lifted by the loading element onto the vehicle roof.

For this purpose, the load rack includes two transversely extending and stationary profiled carriers. On each vehicle side, the loading element having a load bearing structure is displaceably guided by way of adjusting levers into an extended inclined loading position and into a retracted transport position on the vehicle roof. The loading element preferably includes two swivellable profiled carriers respectively on each vehicle side. The profiled carriers are connected on the end side by a carrier rod, and the free ends of the profiled carriers facing away from the carrier rod are each connected with an adjusting lever.

With the adjusting lever, the loading element can be adjusted laterally of the vehicle into a inclined loading position in such a manner that the loading element can take up a downward-directed inclined position. For this purpose, according to the invention, the adjusting lever is held by its one end swivellably by way of a pin in a swivellable profiled carrier and, by its other end, which faces away, the adjusting lever is displaceably arranged by way of a sliding element in a stationary profiled carrier of the load carrier.

To securely support the loading element on the load carrier and on the stationary profiled carriers in the inclined loading position, the adjusting lever is held by a first supporting surface on a stationary stop of the stationary profiled carrier. In the inclined loading position, the first supporting surface of the adjusting lever is arranged in a vertical plane and is situated opposite a corresponding surface of the stop. A second supporting surface of the adjusting lever is arranged with respect to the swivellable profiled carrier at an angle with respect to the first supporting surface of the adjusting lever.

To easily position the profiled carriers of the loading element of both vehicle sides with respect to one another, in the transport position on the vehicle roof, the profiled carriers of the loading element are connected by way of a stationary plug-type element with the directly opposite profiled carrier of the other loading element. In particular, the plug-type element includes a wedge-shaped insertion part into which the profiled carriers can be slid. The plug-type element is preferably fixedly connected with the stationary profiled carrier and is centered on both sides in a wedge shape. The two loading elements (profiled carriers) are mutually fixed in the Z-direction.

According to an embodiment, a locking of the movable profiled carriers of the loading element at the stationary profiled carriers of the load carrier can take place by way of resilient detents which are arranged in a stationary closing cap.

To provide guidance of the profiled carriers for taking up the transport position on the stationary profile carriers situated below, and to ensure the entry of the free ends of the profiled carriers into the corresponding plug-type element, the stationary stop in each case has lateral guiding grooves in which guide webs engage. The guiding grooves are stationarily held on the profiled carrier and are arranged on both sides of the stop. The guide webs are provided on the end side of the profiled carriers and are used to slide the profiled carriers in the case of a transport position. Therefore, according to the invention, by way of the stop, in addition to the guiding tasks, advantageously, vertical forces can be additionally absorbed.

For fixing the profiled carriers situated on top on the stationary profiled carriers arranged underneath in the transport position, one locking pin respectively is provided on the profiled carriers situated on top. The locking pin, in the transport position, projects into a corresponding opening of the stationary profiled carrier. Preferably, the locking pin is held on the end side on a spring element. The adjusting element is connected with the spring element, which adjusting element is arranged outside the profiled carrier and is connected by way of a bent-away tongue of the spring element with the adjusting element on the profiled carriers. At its rearward end facing away from the locking pin, the spring element has a bent-away section which is connected with the profiled carrier.

Other objects, advantages and novel features of the present invention will become apparent from the following detailed description of the invention when considered in conjunction with the accompanying drawings.

DETAILED DESCRIPTION OF THE DRAWINGS

Figure 1:
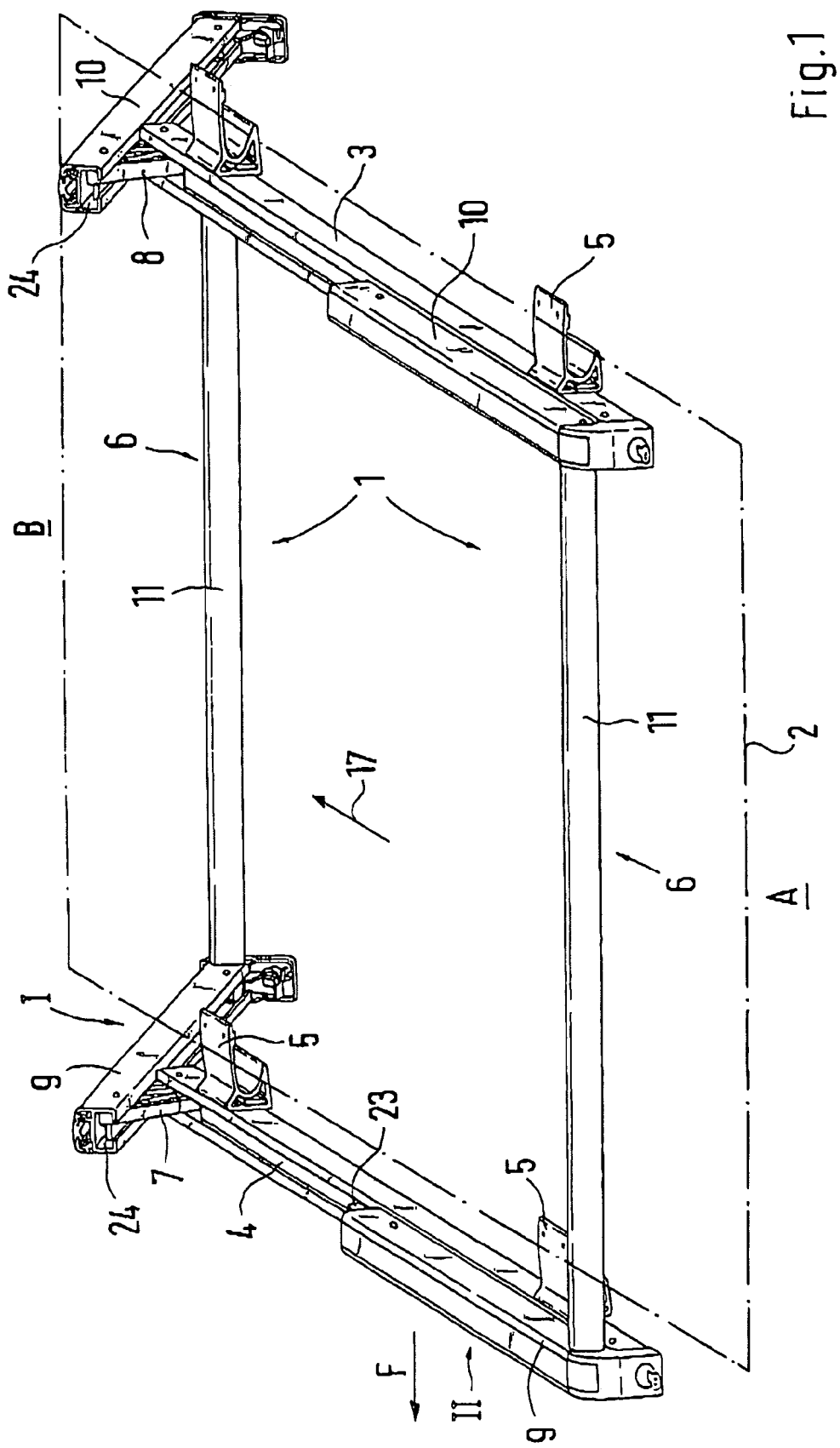
FIG. 1 is a diagrammatic representation of a load carrier, for example, for bicycles, having a loading element which has been swung out on one side.
Figure 2:
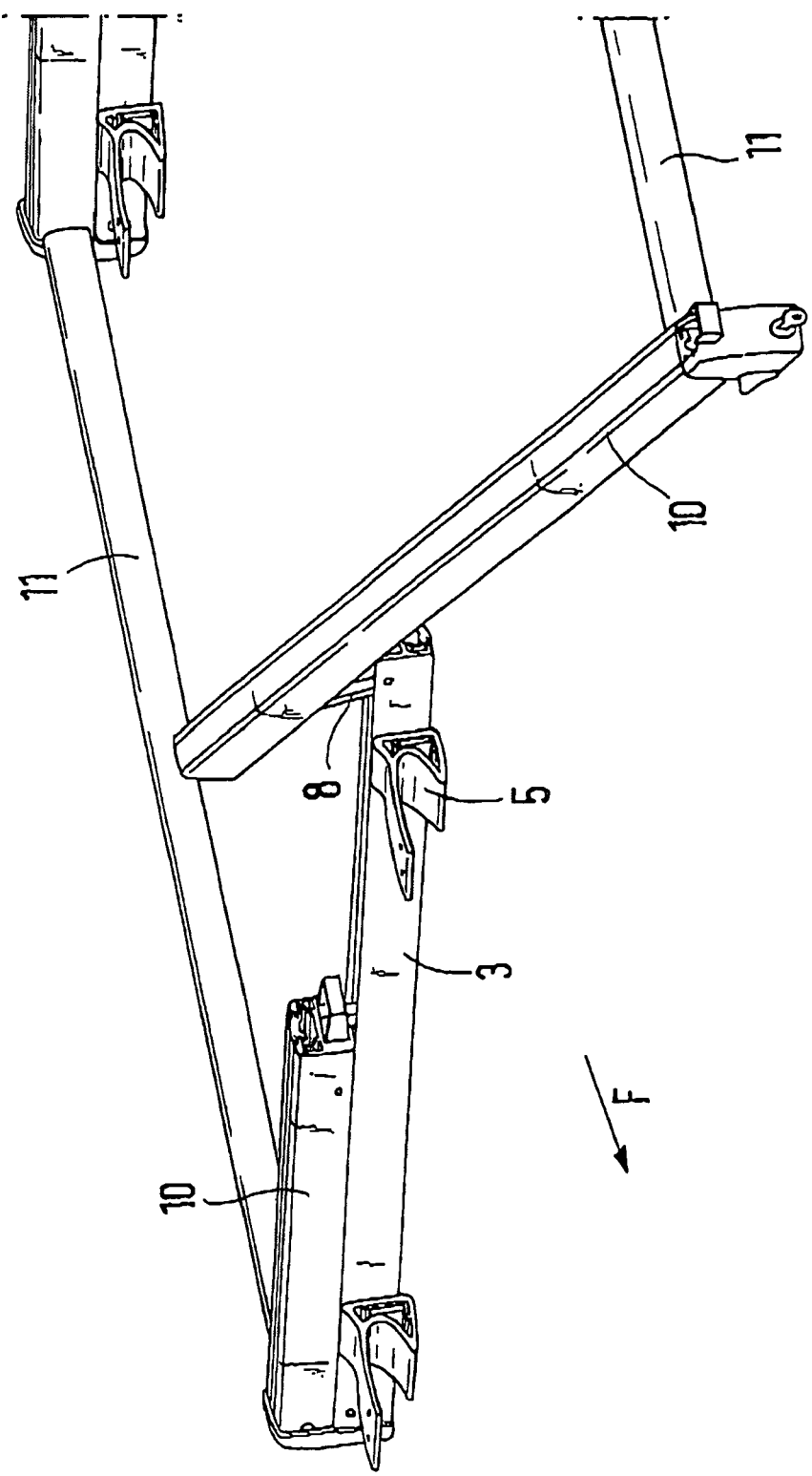
FIG. 2 is a diagrammatic representation of a part of the loading element with swung-out profiled carriers of the loading element.

As illustrated in detail in FIG. 1, a load carrier 1 comprises in each case two transversely extending profiled carriers 3, 4 which are fastened on a roof rack 2 with the fastening elements 5, such as adapters. The fastening elements 5 reach, for example, over a tubular carrier or the like. The roof rack 2 itself is connected with the vehicle, which is not illustrated in detail.

On the profiled carriers 3, 4 of each vehicle side, a loading element 6 is in each case adjustably held by way of adjusting levers 7, 8 on each side A and B of the vehicle. This loading element 6 includes swivellable profiled carriers 9, 10 which are mutually connected by a carrier rod 11.

The loading element 6 of each vehicle side A and B can be displaced by way of the adjusting levers 7, 8 into a lateral inclinedly swung out loading position I and into a transport position II which is deposited on the profiled carriers 3, 4, as illustrated in detail in FIG. 1.

Figure 3:
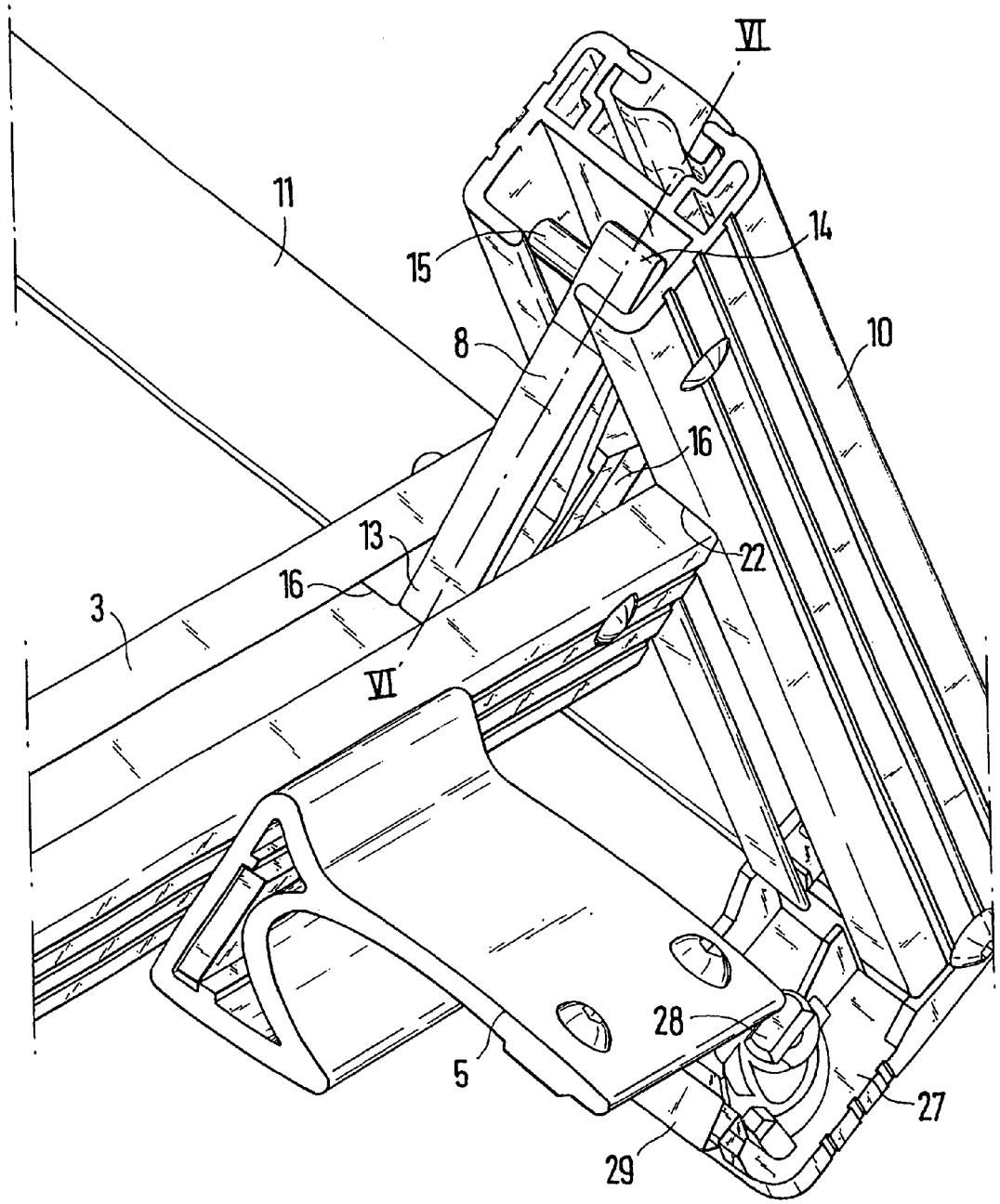
FIG. 3 is an enlarged representation of a swung-out profiled carrier of the loading element with the adjusting lever and the stop.
Figure 4:
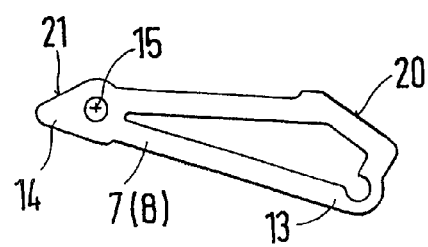
FIG. 4 is a view of onto the adjusting lever.
Figure 5:
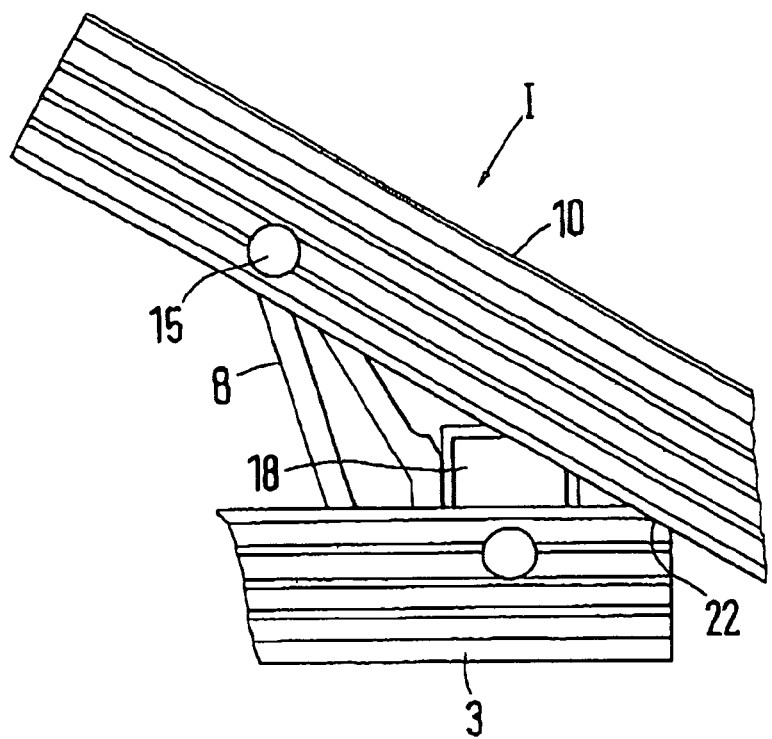
FIG. 5 is a lateral view of the adjusting lever which is linked in the profiled carrier and has a stop.

As shown in FIGS. 3 and 4, at one end 14, the adjusting lever 7, 8 is connected by way of a pin 15 with the swingable profiled carriers 9, 10 and, at the other end 13, it can be displaced by way of a sliding element or by way of a roller 16 in the stationary profiled carrier 3, 4.

Figure 6:
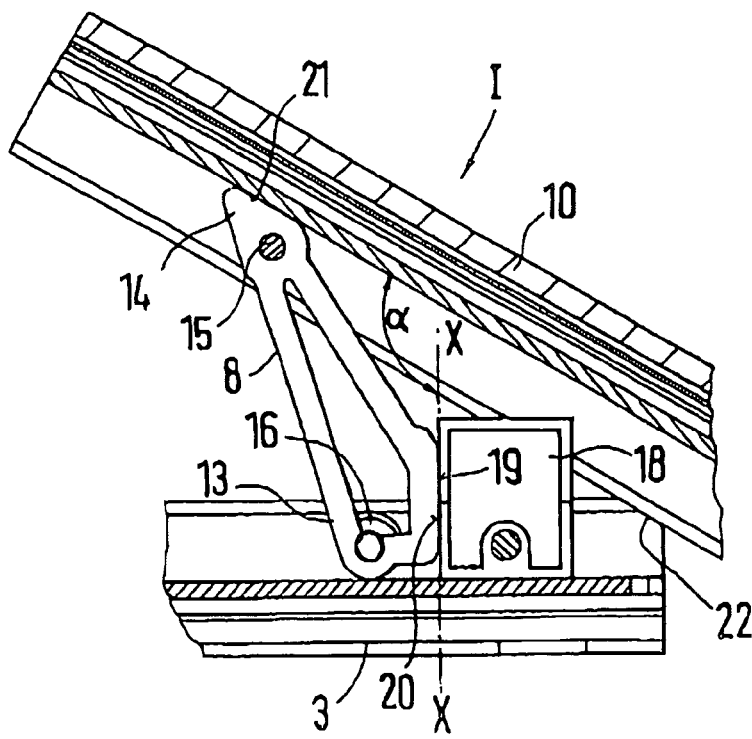
FIG. 6 is a sectional view according to Line VI—VI of FIG. 3 of the adjusting lever.

Returning to FIG. 1, the loading element 6 is pulled from the transport position II on the vehicle roof by the guide by way of the sliding element 16 in the direction of the arrow 17 into the inclined loading position I against a stationary stop 18 in the profiled carrier 3, 4. The profiled carrier 3, 4 has a supporting surface 19 (FIG. 6) which is arranged in a vertical plane X—X and is situated opposite a corresponding supporting surface 20 of the adjusting lever 7, 8. Furthermore, the adjusting lever 7, 8 has another supporting surface 21 which is set at an angle ☐ with respect to the supporting surface 19, 20 and which places itself onto the interior side of the profiled carrier 9, 10. In this inclined swung-out loading position I, a supporting of the profiled carriers 9, 10 therefore takes place by way of the supporting surfaces 19, 20 and 21 as well as on a support 22 at the free end of the stationary profiled carriers 3, 4.

Figure 7:
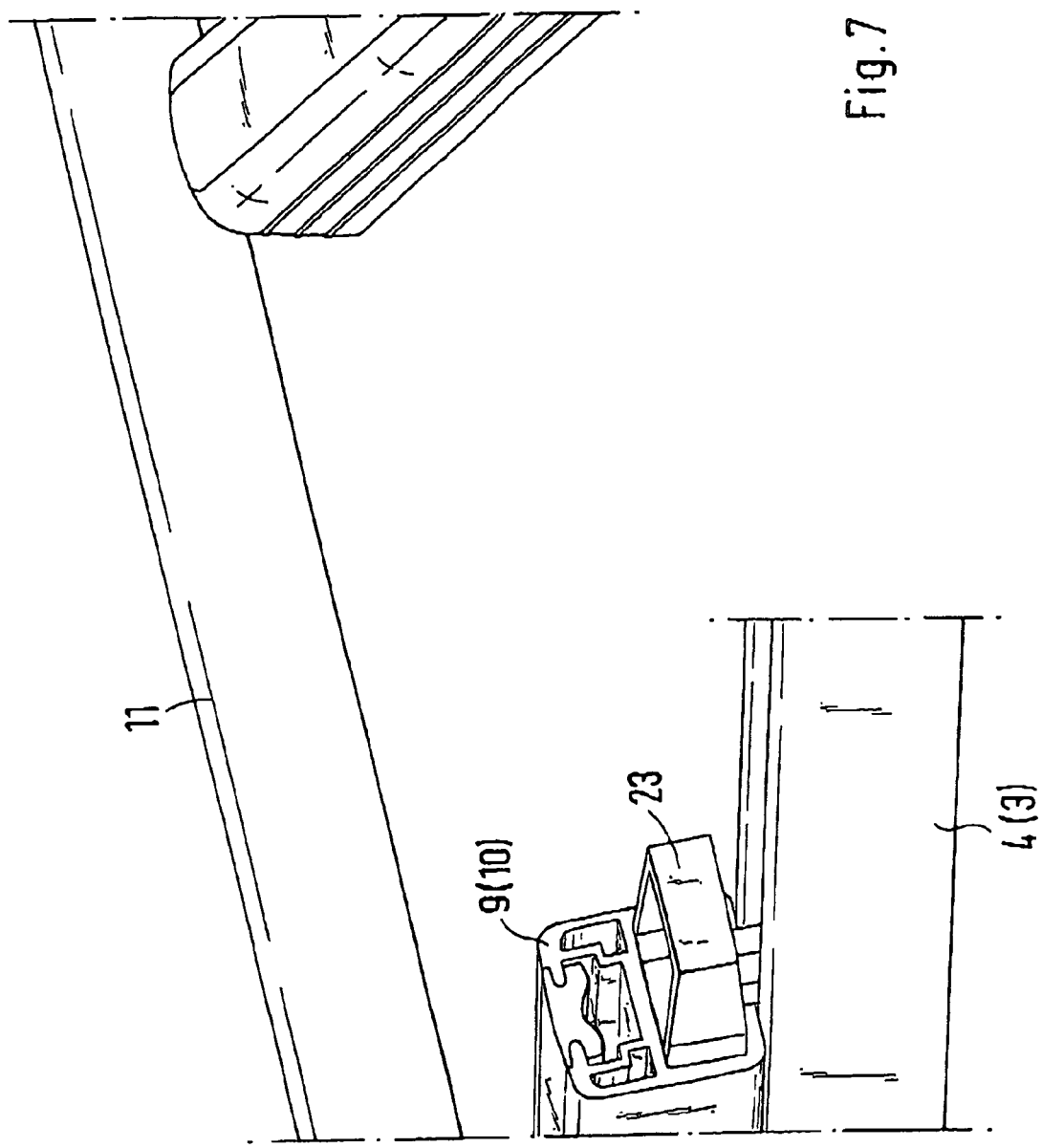
FIG. 7 is a diagrammatic representation of a plug-type element in a profiled carrier of the loading element.

As shown in FIG. 7, a plug-type element 23 is provided on the stationary profiled carrier 3, 4. The plug-type element 23—in the top view and in the lateral view has a wedge shape. The opposite profiled carriers 9 and 10 respectively can be fitted into the plug-type element 23, so that the two mutually connected profiled carriers have a precise arrangement with respect to one another and are connected with one another.

Figure 8:
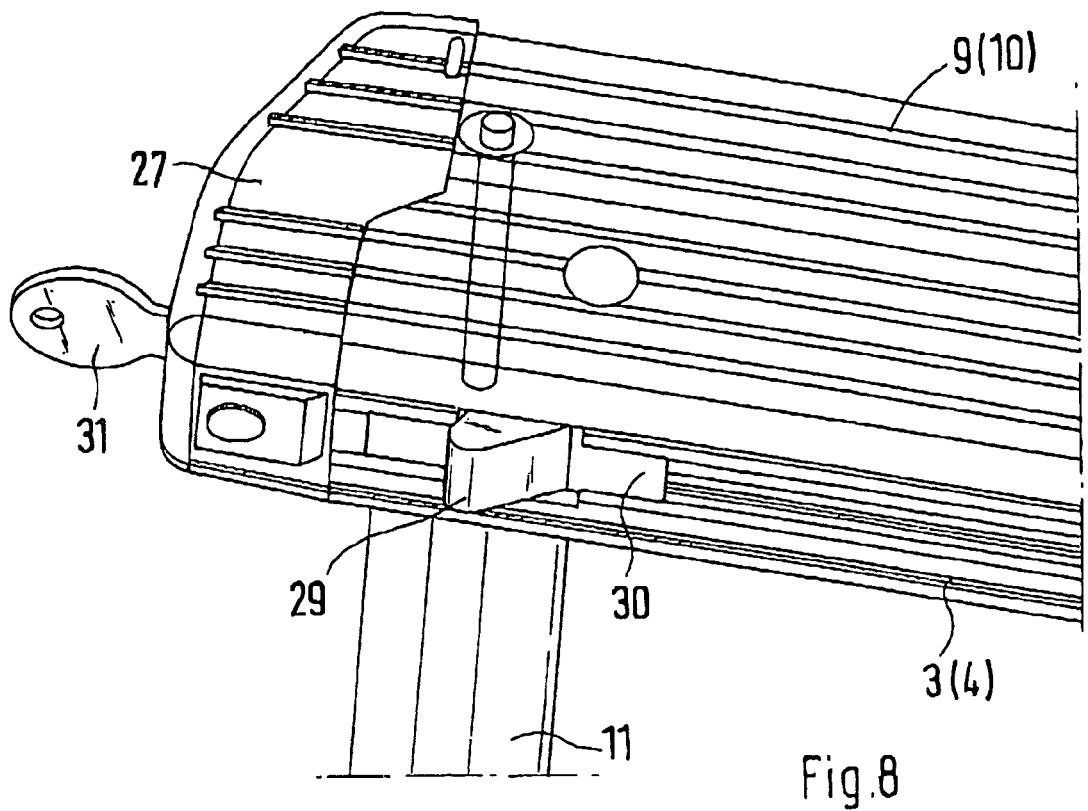
FIG. 8 is a bottom view of a resilient locking tongue in a recess of a stationary profiled carriers.
Figure 9:
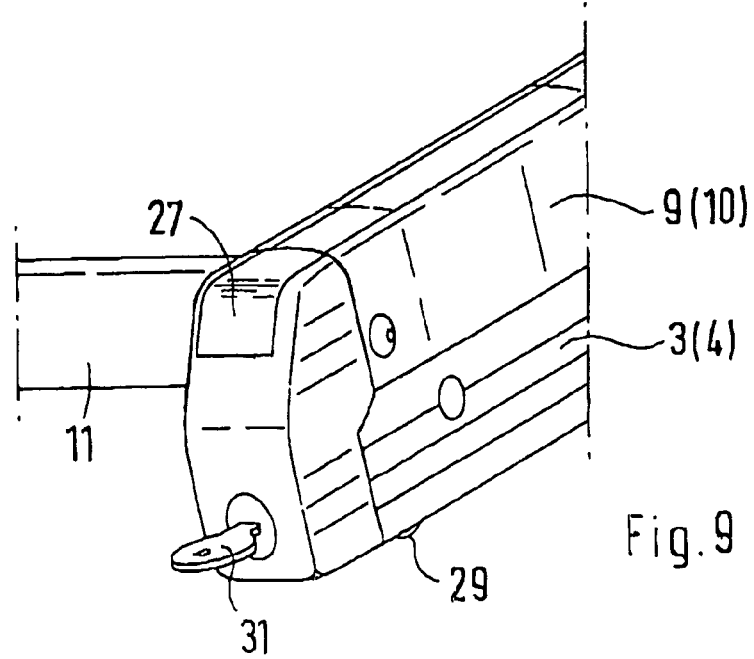
FIG. 9 is a view of a closing cap with a lock and a key.
Figure 10:
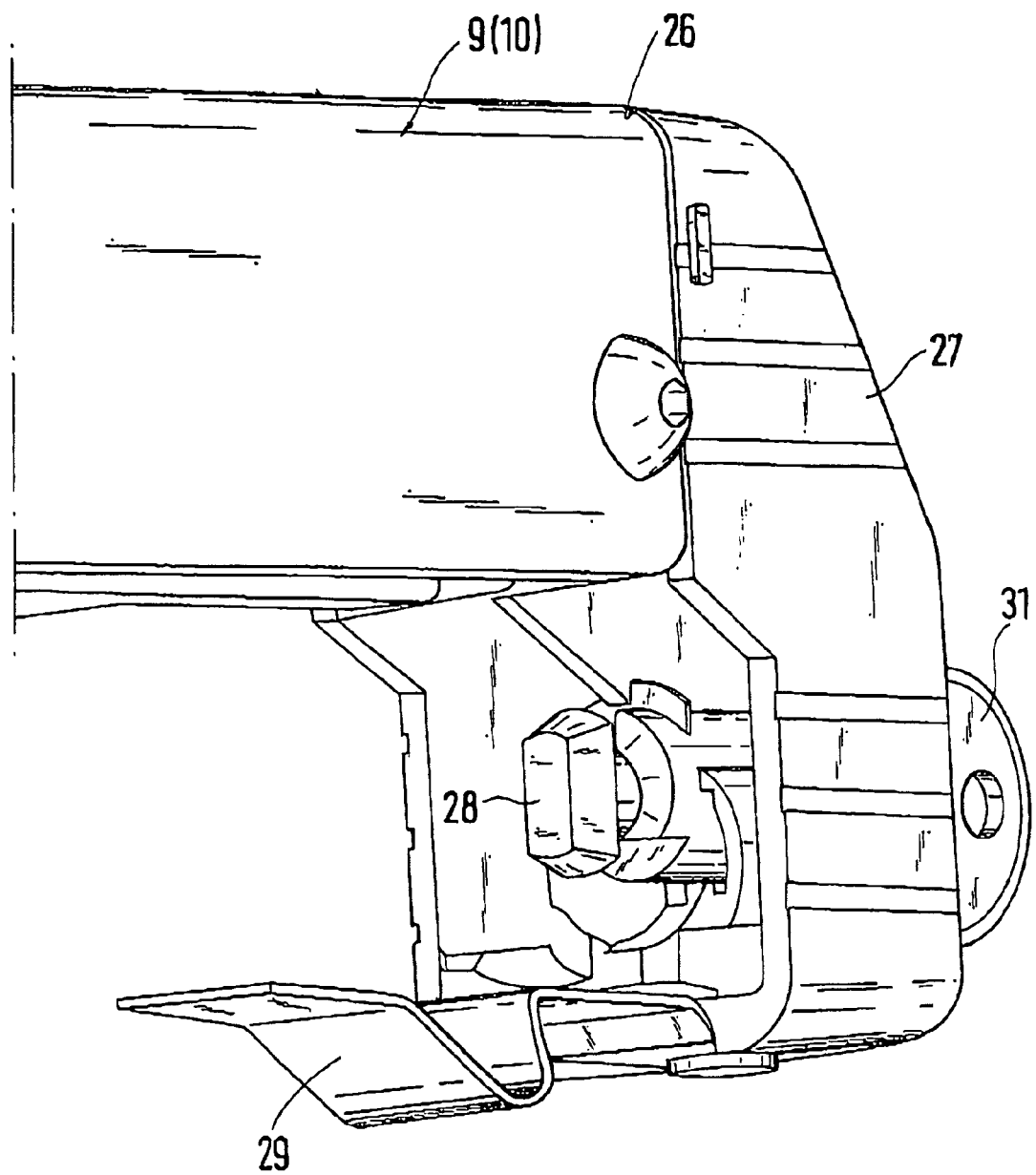
FIG. 10 is an interior view of the closing cap with the resilient locking tongue.
Figure 11:
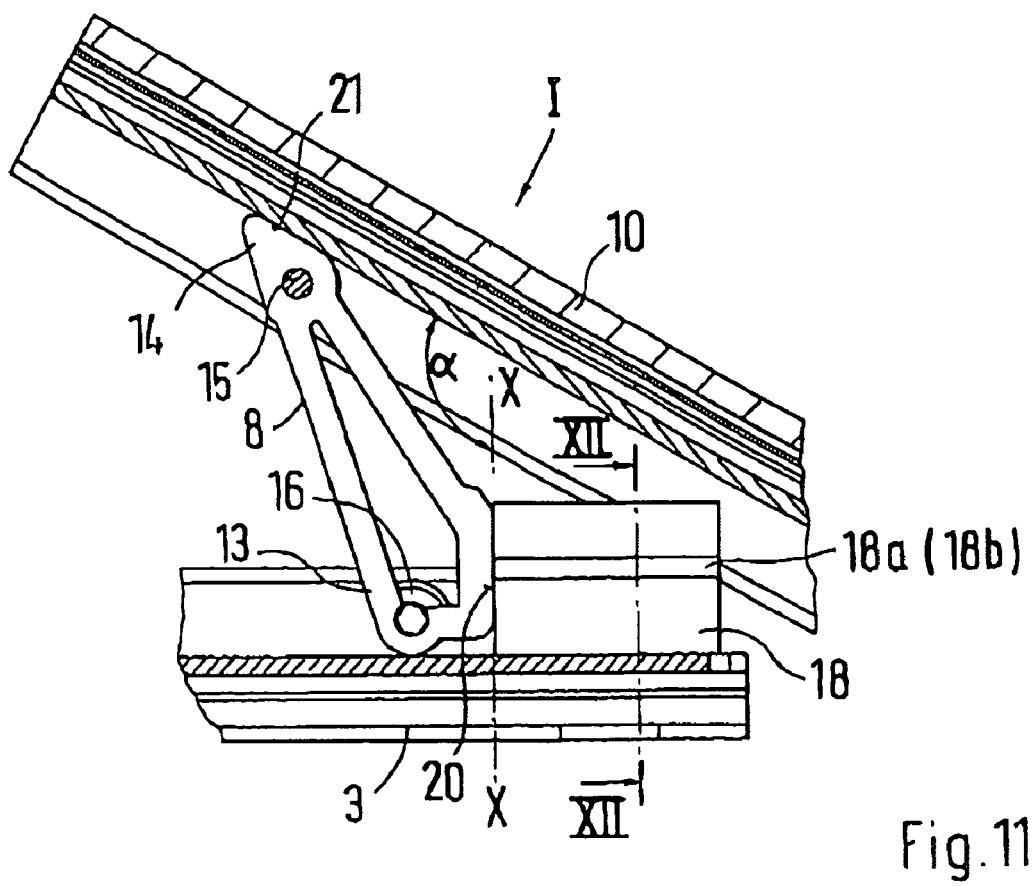
FIG. 11 is a lateral view of a stationary profiled carrier with a stop which is arranged on the end side and has guide grooves.
Figure 12:
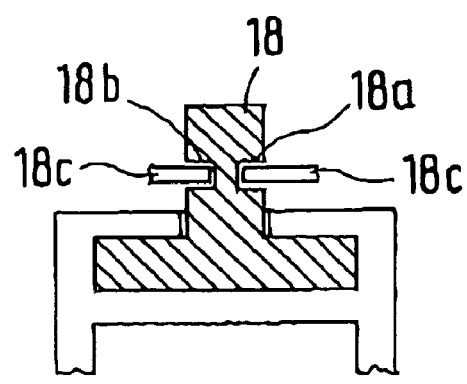
FIG. 12 is a sectional view according to Line XII—XII of FIG. 11.
Figure 13:
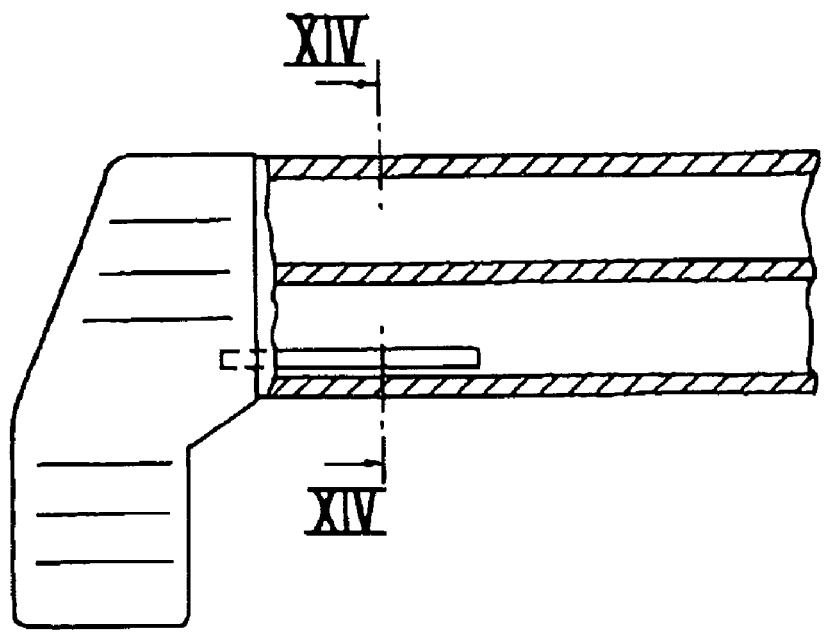
FIG. 13 is a vertical sectional view of a profiled carrier with guide webs situated in the interior.
Figure 14:
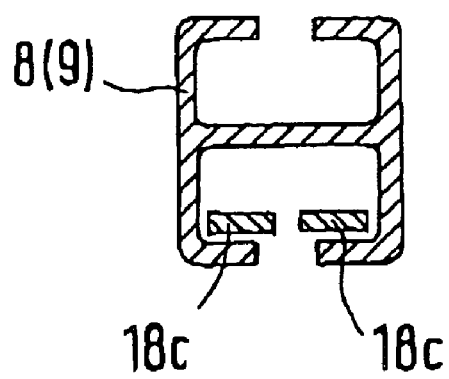
FIG. 14 is a cross-sectional view of a profiled carrier with guide webs situated in the interior according to FIG. 13.

As shown in FIG. 10, at the free end 26 of the swivellable profiled carrier 9, 10, one closing cap 27 respectively is provided which comprises a closing part 28 and which, according to one embodiment, is provided with a resilient locking tongue 29. In the transport position II, the resilient locking tongue 29 locks into a bottom-side recess 30 (FIG. 8) of the stationary profiled carrier 3, 4 and fixes the profiled carrier 3, 4. By way of a key 31, the closing part 28 is rotated into a detent receiving device and is fixed.

For the fixed guiding of the profiled carrier 8, 9 on the stationary profiled carriers 3, 4 arranged underneath, the profiled carriers 8, 9 have guide webs 18c and 18d which are situated in the interior and arranged at the end side. During the displacement of the profiled carriers 8, 9 from the loading position I into the transport position II and vice-verse, these guide webs 18c engage in lateral guide grooves 18a and 18b of the stop 18, which is illustrated in detail in FIGS. 11 to 14.

Figure 15:
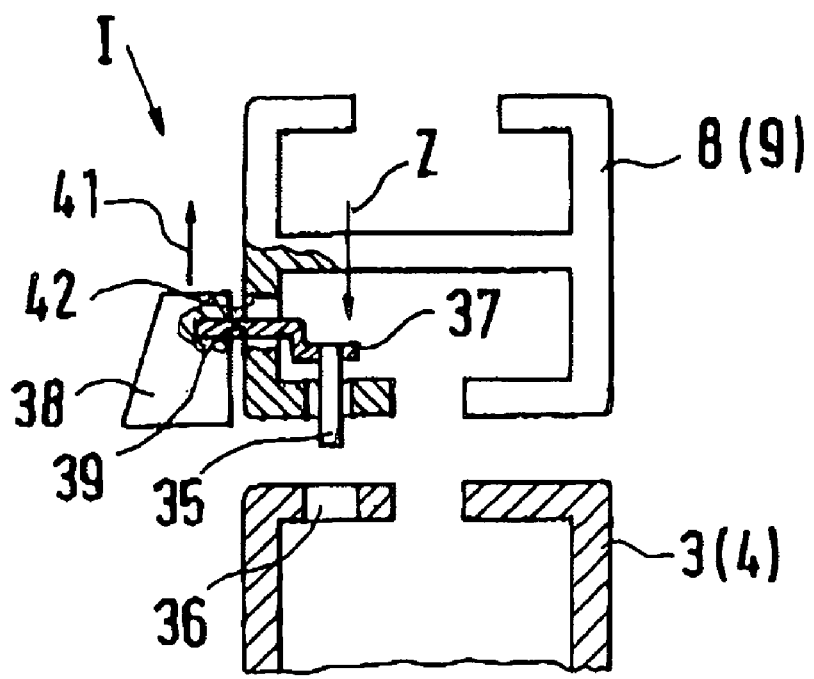
FIG. 15 is a partial cross-sectional view of a profiled carrier and a stationary profiled carrier having a locking pin.
Figure 16:
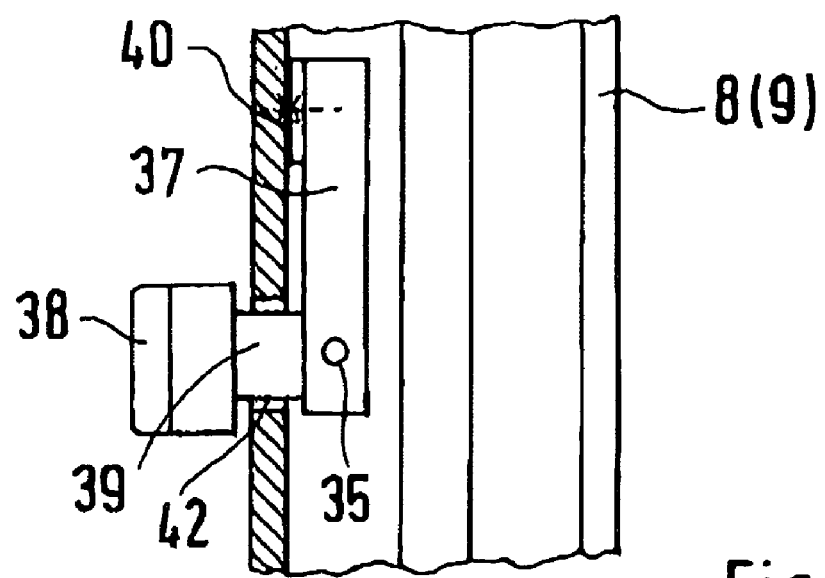
FIG. 16 is a top view of a spring element with a locking pin and an exterior-side adjusting element viewed in the direction of the arrow Z of FIG. 15.

For locking the profiled carriers 8, 9 in the transport position I on the profiled carriers 3, 4 situated underneath, a manually adjustable locking pin 35 (FIGS. 15 and 16) is provided in each profiled carrier 8, 9 which, in the locking position, engages with its shaft in an opening 36 of the profiled carrier 3, 4 arranged underneath. In this position, the profiled carriers 8, 9 take up the transport position II.

When the loading position I is initiated, the locking pin 35 on each profiled carrier 8, 9 has to be released; that is, must be pulled up out of the opening 36 in the direction of the arrow 41 by way of the exterior adjusting element 38, until the end of the pin 35 is flush with respect to the bottom surface of the profiled carrier 8, 9. Only then can the profiled carriers 8, 9 be pulled out by way of the connecting carrier rod 11.

The locking pin 35 is connected with a spring element 37, for example, an oblong leaf spring, which can be fastened on the interior side of the profiled carrier 8, 9 by way of an end-side bent-away section 40 on the profiled carrier 8, 9.

The adjusting element 38 is connected with the spring element 37 in the area of the locking pin 35 by way of a tongue 39 extending through the profiled carrier 8, 9 through a slot 42. This permits movement of the adjusting element 38 in the direction 41 under spring tension. After a release of the adjusting element 38, the adjusting element 38 rebounds into its locking position; that is, the shaft of the pin 35 juts out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Roof rack being fixable on a motor vehicle roof, comprising a load carrier having opposed load-bearing elements and opposed, transversely extending stationary profiled carriers in which, each loading element is displaceably guidable by adjusting levers into an extended inclined loading position and into a retracted transport position on the motor vehicle roof, wherein each loading element comprises spaced swivellable profiled carriers with a connecting carrier rod on an end side thereof, and free ends of the swivellable profiled carriers facing away from the respective carrier rod are connected with the adjusting lever, respectively, wherein, in the inclined loading position, the adjusting lever is held with a first supporting surface on a stationary stop of the stationary profiled carrier wherein each stationary stop has lateral guide grooves in which guide webs engage which are stationarily held on the swivellable profiled carrier and which are arranged on both sides of the stop.

2. Roof rack according to claim 1, wherein the guide webs are arranged on the end side of the swivellable profiled carriers and are usable for achieving a fixing sliding-in of the swivellable profiled carriers into a transport position.

3. Roof rack according to claim 1, wherein one stationary closing cap respectively having a closing element and a resilient locking tongue is arranged at the free end of the swivellable profiled carrier, and, in the transport position of the loading element, the locking tongue engages in a locking manner in one recess respectively of the stationary profiled carrier.

4. Roof rack according to claim 1, wherein a stationary plug-type element is arranged on each of the stationary profiled carriers and, in the transport position, the swivellable profiled carriers can be fitted at a respective stationary plug type element.

5. Roof rack according to claim 4, wherein the plug-type element consists of a wedge-shaped insertion part which can be slid into a face-side opening of the respective stationary profiled carrier.

6. Roof rack according to claim 1, wherein the adjusting lever is held with its one end by way of a pin in a swivellable manner in the swivellable profiled carrier and, with its other end, which faces away, is displaceably arranged by way of a sliding element or a roller in the stationary profiled carrier of the load carrier.

7. Roof rack according to claim 6, wherein the first supporting surface of the adjusting lever, in the inclined loading position, is arranged in a vertical plane and is situated opposite a corresponding surface of the stop, and a second supporting surface on the adjusting lever is arranged with respect to the swivellable profiled carrier at an angle with respect to the first supporting surface of the adjusting lever.

8. Roof rack according to claim 7, wherein the swivellable profiled carriers have a support on the free ends of the stationary profile carriers and, by way of the adjusting lever, can be supported on the stationary stop and, by way of the second supporting surface of the adjusting lever, on an interior surface of the swivellable profiled carrier.

9. Roof rack according to claim 1, wherein, on the end side of the profiled carriers, one adjustable locking pin respectively is held which, in the transport position, projects into a corresponding opening of the stationary profiled carrier and, in the loading position, is arranged in an exposed manner with respect to the opening.

10. Roof rack according to claim 9, wherein the locking pin is held on the end side at a spring element, and an adjusting element is connected with the spring element, and which is arranged outside the swivellable profiled carrier and is connectable with the adjusting element by way of a bent-away tongue.

11. Roof rack according to claim 9, wherein the a spring element, at a rearward end thereof facing away from the locking pin, is connectable with the swivellable profiled carrier by bent-away section.

12. A roof rack for a vehicle, comprising:
a load carrier on a roof of the vehicle, the load carrier including
  a stationary carrier;
  adjusting levers; and
a loading element on at least one side of the vehicle, the loading element including
  two swivellable carriers each having first and second ends, and
  a connecting carrier rod connecting the swivellable carriers near the first ends of the swivellable carriers, wherein the second ends of the swivellable carriers are each connected with one of the adjusting levers and, the loading element being displaceably guided by way of the adjusting levers in the stationary carrier between an extended inclined loading position and a retracted transport position, wherein at the loading position the loading element projects inclinedly downward from the stationary carrier, wherein
  in the inclined loading position a first supporting surface of each adjusting lever is held on a stationary stop of the stationary carrier, the first supporting surface being arranged in a vertical plane and situated opposite a corresponding surface of the stationary stop, and a second supporting surface of each adjusting lever is arranged with respect to the swivellable carrier at an angle with respect to the first supporting surface of the adjusting lever, and the stationary profile carrier has a support for the swivellable profile carriers, which can be supported, by way of the adjusting lever, on the stationary stop and, by way of the second supporting surface, on the adjusting lever.

13. The roof rack according to claim 12, wherein each adjusting lever having first and second ends, the first end of each adjusting lever is held by a pin in a swivellable manner in one of the swivellable carriers, and the second end of each adjusting lever is displaceably arranged by a sliding element or a roller in the stationary carrier.

14. The roof rack according to claim 12, wherein the guide webs are arranged on one of the ends of the swivellable carriers and can be used for sliding of the swivellable carriers.

15. The roof rack according to claim 12, wherein a stationary closing cap having a closing element and a resilient locking tongue is arranged at the second end of each swivellable carrier, and, in the transport position of the loading element, the locking tongue engages in one recess of the stationary carrier.

16. The roof rack according to claim 12, wherein the stationary carrier includes stationary plug-type elements in which, in the transport position, the swivellable carriers extend respectively.

17. The roof rack according to claim 16, wherein each plug-type element includes a wedge-shaped insertion part which can be slid into a face-side opening of the corresponding swivellable carrier.

18. The roof rack according to claim 12, wherein in the inclined loading position the first supporting surface of each adjusting lever is arranged in a vertical plane and is situated opposite a corresponding surface of the stationary stop, and a second supporting surface of each adjusting lever is arranged with respect to the swivellable carrier at an angle with respect to the first supporting surface of the adjusting lever.

19. The roof rack according to claim 18, wherein the stationary profile carrier has a support for the swivellable profile carriers, which can be supported, by way of the adjusting lever, on the stationary stop and, by way of the second supporting surface, on the adjusting lever.

20. The roof rack according to claim 12, wherein each swivellable carrier includes an adjustable locking pin which, in the transport position, projects into a corresponding opening of the stationary carrier and, in the loading position, does not project into the opening.

21. The roof rack according to claim 20, wherein the locking pin is attached to a spring element, and an adjusting element is connected with the spring element and is arranged outside the swivellable carrier and wherein the spring element can be connected with the adjusting element by way of a bent-away tongue of the spring element.

22. The roof rack according to claim 21, wherein the spring element, at its end facing away from the locking pin, can be connected with the carrier by way of a bent-away section.

* * * * *